INVENTORS
ERNEST C. KOERNER
RALPH W. HALL
GEORGE D. HILKER
WILLIAM W. WAREHAM by Hood, Gust, Irish & Lundy
Attorneys 3,745,138
BONDING COMPOSITION CONTAINING A
BLOCKED ISOCYANATE
Ernest C. Koerner, Ralph W. Hall, George D. Hilker, and William W. Wareham, Fort Wayne, Ind., assignors to Phelps Dodge Magnet Wire Corporation, Fort Wayne, Ind.
Filed Aug. 14, 1968, Ser. No. 752,541
Int. Cl. C08c 11/28
U.S. Cl. 260—33.4 UR
6 Claims

ABSTRACT OF THE DISCLOSURE

A resinous bonding composition which is a combination of a compound having a plurality of

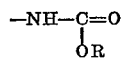

groups where R is any aliphatic or aromatic organic radical and a thermoplastic resin having a plurality of hydroxyl groups. This resinous product is soluble in a solvent to the extent that article may be coated or impregnated with the resinous composition by conventional dipping or wiping followed by solvent evaporation. Articles coated with the resinous product can be bonded together by softening the product either by heating the resinous coating to temperatures above its softening point or by applying selective solvents to the resinous coating. The significant feature of the new resinous product is that the resinous product can then be thermoset, if desired. In specific applications, the new resinous product can be used as a magnet wire enamel and a cement for bonding coated articles into various self-supporting and integral structures for example coils made of magnet wire, and other fixed forms made of fibrous materials such as paper or cloth materials including textiles and nonwoven materials impregnated with the resinous product of this invention or further as an adhesive that can be thermoset by the method of the invention. The method of the invention, in the specific embodiment relating to magnet wire, includes the steps of combining the resin and compound above-mentioned to form a resinous product, preparing a solution of the resinous product, coating a conductor with the resinous product in a conventional manner which includes the baking of the coated conductor to remove the solvent therefrom, forming a coil of the magnet wire coated with the product, and bonding adjacent portions of magnet wire together to form a bonded coil product. This latter step can be performed by using additional solvent or by heating the coil in a selected manner which may result in the resinous product either remaining thermoplastic or becoming thermoset, as desired.

BACKGROUND OF THE INVENTION

Field of the invention

The present invention relates to a bonding composition and more specifically to a resinous bonding composition which can be utilized as a material coating for adapting said material to be bondable to like materials by either conventional solvent or heating techniques in a manner selectively leaving the bonding composition as a thermoplastic resinous material or a thermoset resinous material, as desired.

DESCRIPTION OF THE PRIOR ART

Bonding compositions have long been used. Among the early uses of bonding compositions was the manufacture of self-supporting bonded electrical coils. These coils were made from a wire coated with black enamel insulation and an outer coat of resin, such as cellulose acetate lacquer. The coated wire was then wound into a coil and treated with a solvent, such as acetone, to soften the resin and to bond adjacent portions of the wire together. Alternatively, a coil was formed of conventional magnet wire and resin was impregnated into the coil after it was wound by submerging the coil in a resin solution or by the use of vacuum impregnation techniques. These procedures employing a solvent were generally not totally satisfactory for the reason that solvent could be trapped in the coil. Trapped solvent may degrade the resin or enamel during the curing of the resin or during subsequent use of the coil. Moreover, the solvent which evaporated during the process leaves voids in the coil insulation and thereby may weaken the coil or alter its electrical properties.

These deficiencies led to the widespread adoption of other bonding compositions such as vinyl buytral, the reaction product of butylaldehyde and vinyl acetate-vinyl alcohol. These bonding compositions are thermoplastic resins. Such compositions can be applied as a coating to magnet wire by conventional techniques. The turns of a coil made from magnet wire coated in this manner can then be bonded by heating, or, if desired, by the use of a solvent, or a combination thereof. In the field of magnet wire, insulated wire with an additional coating of a thermoplastic bonding composition or cement is commonly referred to as self-bonding magnet wire. One example of self-bonding magnet wire is that sold by Phelps Dodge Magnet-Wire Corporation under its Trademark "Bondeze."

Thermoplastic self-bonding magnet wire enjoys an ever increasing use in the manufacture of self-supporting yokes for television receivers, coils, bobbin-less coils and other windings; however, where turn to turn bonding is required, the thermoplastic nature of prior bonding compositions limits the use of such articles to uses below the softening temperature of the bonding composition. The softening temperatures of conventional compositions of this nature are generally between 80° C. and 130° C. The use of such articles above the softening temperature is accompanied by a risk of change in the bonded shape, the physical properties, or the electrical properties of the article. In an armature winding or the like where the bonded article is subject to forces which tend to distort the bonded shape of the article, persistent use of the article at temperatures in the area of the softening temperature of the bonding composition can result in failure of the article.

Certain special bonding agents with high softening temperatures do allow such compositions to be used at operating temperatures, perhaps as high as 150° C. However, these compositions also may fail at temperatures approaching the softening point of the composition. Thus, so long as the bonding composition remains thermoplastic, the use of the bonded article is limited. This is particularly true in electrical devices since short-time temperatures of 250° C. and higher are occasionally encountered.

Usually, it has been impractical to employ a thermosetting bonding composition for the reason that conventional techniques for applying such compositions comprise steps which involve temperatures which may prematurely, partially or wholly thermoset the composition thereby to partially or wholly reduce the effectiveness of the final bond.

At least some of the conventional techniques for applying such bonding compositions to articles include the submerging of the article in a solution of the bonding composition and the evaporation of the solvent by baking the coated article. Conventional solvents of such bonding compositions generally have boiling points in the range from about 80° C. to about 230° C. Known thermosetting resins are thermoset within this same temperature range. For this reason, many such resins usually can not be applied by these techniques, since it is, for all practical purposes, impossible to control the cure of the resin while evaporating the solvent from the resin.

Other known thermosetting bonding compositions are not preferred for various reasons, some of which are: (1) the bonding compositions can not be used as a thermoplastic bonding composition because of the instability of the bonding composition, (2) the bonding composition is either thermoset at a temperature higher than desirable, or the residue produced by the thermosetting reaction remains in the resin unless the resin is heated to a temperature higher than desirable, (3) the bonding composition is a material which can be only hardened, cured, cross-linked, or the like by a single or a relatively few materials or which can only be used as an overcoat on specific materials, and thus, is limited in use, or (4) the bonding composition is cured by a mechanism including a condensation polymerization or addition reaction that progress at a rate which is a function of time at any moderate temperature.

For all the reasons above stated, there has been a need for a versatile and practical bonding composition which can be applied to articles by conventional solvent activation techniques to finally form a non-tacky, abrasion resistant and pliable film which will remain in the thermoplastic form for a long period of time at normal storage temperatures but which subsequently can be used as a self-bonding composition either by heat treatment or by selected solvent treatment but which, if so desired, can be thermoset by a controllable cure mechanism, for example, a mechanism including a reaction which progresses only at elevated temperatures.

SUMMARY OF THE INVENTION

It is therefore a primary object of this invention to provide an improved bonding composition.

It is another object of this invention to provide an improved bonding composition which can be applied to articles by conventional techniques and which can be selectively left in either a thermoplastic or thermoset state, as desired.

It is yet another object of this invention to provide an improved bonding composition which consists of a thermoplastic resin, soluble in a solvent having a boiling point at atmospheric pressure preferably below 160° C., which can be applied to articles by conventional techniques as a tough, non-tacky, thermoplastic film which will remain stable over long periods of time at room temperatures, and which can be thermoset, if desired, by heating the resin to temperatures in excess of a predetermined "unblocking temperature" of the resin.

It is yet still another object of this invention to provide an improved bonding composition which has all of the physical and electrical properties of good magnet wire insulation.

It is still another object of this invention to provide an improved self-bonding magnet wire having a high shelf life which can be formed into coils and like structure and bonded into self-supporting integral structures by conventional solvent techniques or by heating the wire to temperatures in excess of the softening point of the resin but preferably below 160° C. and which can be thermoset, if desired, by heating the wire to temperatures in excess of a predetermined "unblocking temperature" of the resin.

It is still another object of this invention to provide an improved self-bonding product comprising a porous and flexible material impregnated with an improved bonding composition which can be used to form integral and self-supporting articles by conventional techniques, the bonding composition being selectively left in either a thermoplastic or thermoset state, as desired.

A further object of this invention is to provide an improved process for fabricating both thermoplastic and thermoset self-supporting articles from a self-bonding material.

Still further an object of this invention is to provide an improved process for fabricating self-supporting and integral articles from self-bonding magnet wire having a coating of an improved bonding composition which can be applied to magnet wire by techniques which are conventional for applying enamel to magnet wire, and which can be selectively left as a thermoplastic resin material or thermoset to produce articles which can be used at temperatures above the softening point of available thermoplastic bonding compositions.

In accordance with the broader aspects of the invention, an improved bonding composition is provided which is a combination of a compound having a plurality of

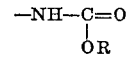

groups where R is any organic radical and a resin. Also in the broader aspects of the invention, a self-bonding product which has a coating of the bonding composition thereon or which is impregnated with the bonding composition is provided. Further, in the broader aspects of the invention, there is provided an integral and self-supporting bonded product, and a process for fabricating such a bonded product. The process comprises the steps of forming an article from a material, portions of which have the bonding composition above-mentioned associated therewith, positioning the portions of the material in contact with each other and bonding these portions of the material together in a manner to selectively leave the reaction product as either a thermoplastic or a thermosetting resin, as desired.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
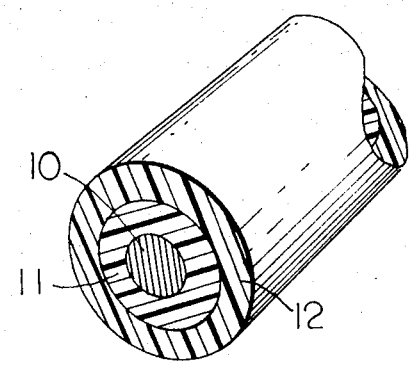
FIG. 1 is a fragmentary and perspective view of an article having a circular cross-section coated with an insulating material and the improved bonding composition of this invention.

In accordance with the present invention an improved bonding composition is provided by combining a compound having a plurality of

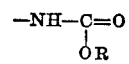

groups with an essentially linear thermoplastic bonding resin. The letter "R" is used herein to indicate organic radicals, including both aliphatic and aromatic radicals.

The term "thermoplastic" is used herein to describe that property of the resin which describes the weakening of the van der Waals forces and thus the softening of the resin at temperatures above a "softening point" without any irreversible reaction occurring. In contrast, the term "thermoset" is used herein to refer to a resin which undergoes an irreversible reaction as the temperature of the resin is raised considerably above the "softening point"

of the resin, such that when the resin is raised to temperatures above the previous "softening point," the resin will then not soften.

Further defining thermoplastic and thermoset resins are their physical properties. The physical thermal properties of thermoplastic resins differ from the physical thermal properties of thermoset resins in that thermoset resins have substantially higher softening temperatures (by 100° C. or more), substantially higher decomposition temperatures, substantially better resistance to attack by solvents, and substantially improved resistance to thermal aging, than thermoplastic resins of the same species.

The term "bonding resin" is used herein to describe those resins which when formed into test samples and tested in accordance with a Helical Coil Bond Test (Phelps Dodge Test Procedure No. 46 to be hereinafter described), the bond strength is no less than 300 grams at 100° C.

Various thermoplastic bonding resins can be used; however, the preferred bonding resins are essentially linear, thermoplastic bonding resins having at least three reactive sites per one hundred repetitive units of the resin such as the well known polyvinyl butyral resins, i.e. the "Butvar" resins sold by Monsanto Co.; the phenoxy resins, i.e. the "Eponols" sold by Shell Chemical Co.; and the polyester resins, i. e. the ethylene glycol terephthalate phenyl indenate polyester copolymers. In this context a reactive site for example may be a —OH group, a —NH group, or the equivalent.

The compounds mentioned above which have more than one

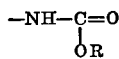

group are preferably substantially "blocked" isocyanates. Many poly-isocyanates can be used; preferably the isocyanate is either a p,p' diphenyl methane diisocyanate such as "Multrathane M" as sold by Mobay Chemical Co. or "Mondur MR" as sold by Mobay Chemical Co., a trimethylolpropane triisocyanate or a tris(toluylene isocyanate) isocyanurate.

These isocyanates are "blocked" either by an alcohol or a soluble compound which has in solution a

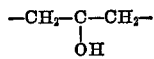

group in equilibrium with a

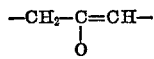

group. Preferably, these "blocking agents" are from the group of lower alcohols such as methanol; ethanol; any propanol, isopropanol being preferred; any butanol, tertiary butyl alcohol being preferred; any pentanol, tertiary amyl alcohol being preferred; cyclopentanol; cyclohexanol and any other aliphatic cyclic and aromatic alcohols or compounds such as those described which have boiling points at atmospheric pressure between about 60° C. and about 220° C.

Enough alcohol or other "blocking agent" is reacted with the isocyanate to produce a substantially "blocked" isocyanate which will remain "blocked" at temperatures below a temperature, for example, 140° C., for long lengths of time. Specific examples have remained stable at normal storage temperatures for years. Also, this "blocked" isocyanate must be capable of being substantially "unblocked" at a temperature above this temperature. The choice of the "unblocking" conditions (time and temperature) in a specific instance, will be dependent upon manufacturing considerations and supporting materials. For example, the preferred temperature range in which the bonding compositions of this invention are thermoset and the isocyanates thereof are "unblocked" is from about 160° C. to about 200° C. However, temperatures above 200° C. can be used and could be preferred if the remainder of the article and coatings on the article can withstand temperatures above 200° C.

The preferred temperatures, time and temperature relationships, temperature ranges, "blocking agents" and solvents mentioned throughout this description refer to those temperatures, time and temperature relationships, temperature ranges, "blocking agents" and solvents preferred in relation to bonding compositions having end uses as coatings on conductors applied by conventional wire coating techniques and utilizing wire coating towers and the like. Many of these preferences relate to limitations of existing commercially available equipment used in conjunction with this technique; and thus, the preferred temperatures, time and temperature relationships, temperature ranges, "blocking agents" and solvents are likely to change as new techniques or equipment are provided to coat wires or new or different techniques are used.

The substantially "blocked" isocyanate and the thermoplastic resin as above-mentioned are combined to form the improved bonding compositions of this invention. Preferably these bonding compositions are soluble in a solvent having a boiling point at atmospheric pressure of less than 160° C. to the extent that a solution of the bonding composition in the solvent having about 12% weight to about 40% weight resin has a solution viscosity of about 100 to about 3000 centipoises at 25° C. Also, it is highly desirable that the resin be soluble in relatively cheap solvents such as alcohol, methoxy or ethoxy ethanol, xylenes, or other commercially available solvents which have good viscosity stability at room temperature and a good rate of evaporation at temperatures near 140° C. to 160° C. A specific solvent may also include a "blocking agent" of the group above-mentioned, and a specific "blocking agent" may also include a solvent.

The resulting combination of resin and substantially "blocked" isocyanate is a thermoplastic resin. Preferably, the resin comprises a stoichiometric amount of isocyanate; however; the quantity of isocyanate may be varied depending upon the end use of the article bonded by the bonding compositions of the invention.

Preferably, the bonding compositions of the invention can be applied to an article for example an electrical conductor from solution either by dipping, rolling or wiping the article in the resin solution and removing the solvent from the solution by baking the article at temperatures below the "unblocking temperature" of the "blocked" isocyanate. With reference to the application of the bonding compositions to a conductor, conventional wire-coating techniques can be used. As above-mentioned, the preferred solvents of the bonding compositions of this invention have boiling points under 160° C. and the preferred "blocking agents" result in the "blocked" isocyanate having "unblocking temperatures" above 140° C. By using the preferred solvents and "blocking agents," the bonding compositions can be baked in ovens held at temperatures near the boiling point of the solvent and the solvent removed therefrom without "unblocking" the isocyanate and thermosetting the resin. The resulting coating of the bonding composition, thus, remains thermoplastic.

FIG. 1 shows a typical round conductor 10 having a coat 11 of an insulating material and a coat 12 of a bonding composition of this invention thereon. When the coat 11 is used, the specific insulation used can be any one of a number of conventional enamels, coatings, or insulations, as required, keeping in mind the differences in the thermoplastic flow properties of the specific insulation and bonding composition used.

Figure 2:
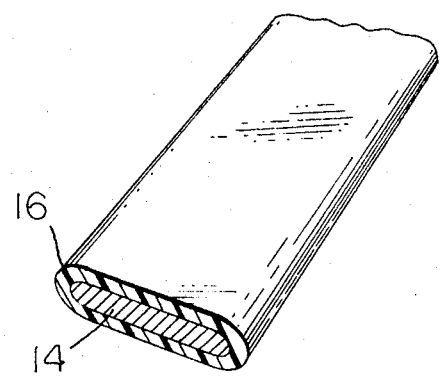
FIG. 2 is a fragmentary and perspective view of a conductor having a rectangular cross-section coated solely with the improved bonding composition of this invention.

FIG. 2 shows an article, for example, a fiber of glass or other materials from which textiles are made, a filament of paper, or other porous or absorbent materials, or other non-porous or non-absorbent materials, or the like having thereon a single coat 12 of a bonding composition of this invention.

Articles coated with the bonding compositions of this invention such as the coated articles shown in FIGS. 1 and 2 can be stored at room temperatures, indefinitely, without setting the bonding composition since the "blocked" isocyanates above-mentioned are stable up to about 140° to 160° C. Further, all articles coated with the bonding compositions of this invention may be formed into a desired shape and bonded with adjacent portions of the coated article either by conventional solvent techniques or by heating the coated article above the softening temperature of the bonding composition to provide a self-supporting and integral bonded structure. The bonding composition will remain a thermoplastic resin so long as the temperature of the bonded article is kept below about 140° C. to 160° C. Such articles, respectively, are for all practical purposes similar to conventional thermoplastic bonded articles and have all the characteristics of prior art self-bonding articles such as magnet wire. In addition, the bonding composition can be thermoset if desired as will be mentioned hereinafter and the bonding composition itself is an insulating material.

The bonding compositions of this invention may be thermoset by heating a bonded article to a temperature above 160° C. preferably from about 170° C. to about 200° C. This temperature will be sufficient to "unblock" the isocyanate in the resin and the thermoplastic bonding composition will be permanently thermoset. In this state, the bonding composition will have all of the improved properties of thermoset resin materials above-mentioned.

Figure 3:
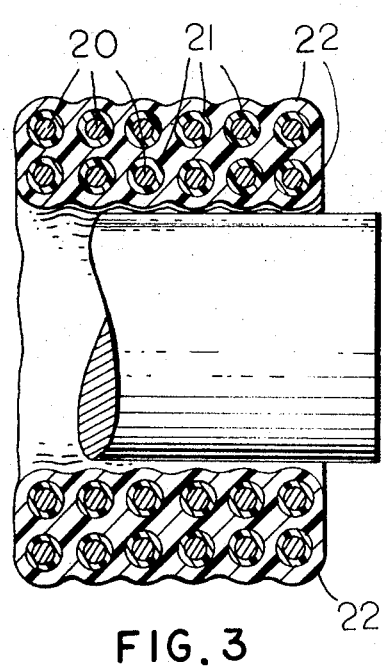
FIG. 3 is a fragmentary and cross-sectional view of a coil made of the coated conductor illustrated in FIG. 1 and bonded into a self-supporting and integral structure by the bonding composition of this invention.

A coil bonded in the manner above-described is illustrated in FIG. 3 and consists of a coil conductor 20 having a coat 21 of insulation and a coat 22 of bonding composition which has been treated with solvent or heated so as to bond the adjacent portions of the conductor 20 together in accordance with the method of this invention. Such coils can be used at temperatures and with solvents which would deleteriously affect coils bonded together by thermoplastic resins.

As above-mentioned, the isocyanate of the bonding composition is substantially "blocked" prior to its combination with the thermoplastic resin. This "blocking" of the isocyanate is believed to be in accordance with the following reaction:

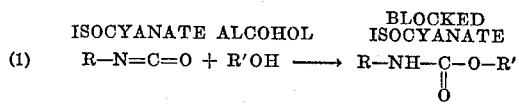

Also, the "blocked" isocyanate in the bonding composition of the invention becomes "unblocked" at temperatures above the unblocking temperatures of the bonding composition preferably from about 170° C. to about 200° C. The isocyanate reacts with the resin and becomes thermoset or cross-linked generally in a manner believed to be in accordance with the following reaction:

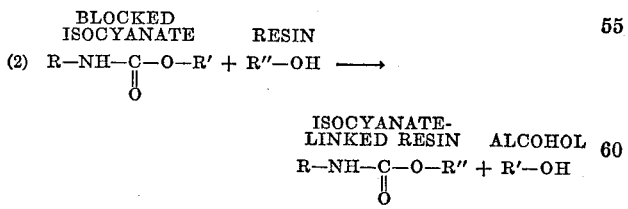

These equations are illustrative only. Actually, cross-linking occurs randomly between two or more functional groups, although for simplicity the reactions show only single functional groups involved in the reaction.

Further, a small quantity of the "blocking agent," estimated as a maximum to be on the order of ten percent weight of the bonding composition is released from the bonding composition as the resin becomes thermoset. This released "blocking agent" or residue from the thermosetting reaction functions as a softening agent of the bonding composition; and thus, the bonding composition is rendered more flowable than otherwise expected such that adjacent portions of articles coated with the bonding composition of this invention are more uniformly bonded together than heretofore experienced using prior art thermoplastic resins, either by conventional solvent techniques or the lower temperature techniques, i.e., below about 140° C. to 160° C. above-mentioned. Such uniformity is an unexpected advantage of the present invention. The "blocking agent" released during the process is removed from the bonded resin upon subsequent baking of the bonded article.

Any "blocking agent" or solvent allowed to remain in the bonded resin must be inert so as to avoid any injury or effect upon the bonding composition or an under-coat during the "unblocking" process or thereafter. Preferably, the finished bonded product is completely free of solvent and "blocking agent" or any residue from the thermosetting reaction. For this reason, the baking of an article coated with the bonding composition of this invention should occur for a time at a temperature sufficient to expel all of the solvent from the resin and the baking of the bonded product should occur for a time and at a temperature sufficient to expel all of the "blocking agent" or any residue from the thermosetting reaction. Both the solvent and the "blocking agent" or residue must diffuse through the bonding composition to be completely removed therefrom. Thus, the removal of both the solvent and the "blocking agent" or residue from the bonding compopsition requires a sufficient length of time for the diffusion to occur. The higher the baking temperature and the higher the volatility of the material being diffused, the less time will be required. For this reason, the preferred solvents have relatively high volatility at temperatures near their boiling points and the preferred "blocking agents" have high volatility near their "unblocking temperature." The preferred solvents, in addition, have relatively low volatility at temperatures appreciably below their boiling points such that solvent evaporation is low.

The following examples will illustrate the present invention.

EXAMPLE I

A solution containing 120 grams of trimethylolpropane triisocyanate (Mondur CB 75, sold by Mobay Chemical Co.) and 300 grams of tertiary amyl alcohol was refluxed for three hours at approximately 109° C. After cooling, this mixture was stirred into a room temperature solution of 330 grams of vinyl butyral resin (Butvar B 73 resin, sold by Monsanto Co.) in 1650 grams of normal butanol and 600 grams of xylene.

The product was then applied to an insulated conductor employing dies by a conventional wire coating tower having bank temperatures of 275° F., 375° F., and 475° F., respectively. The increase in diameter of the bonding top coat was between 0.7 and 1.0 mil for AWG 24 wire. The resulting over-coated conductor was spooled and handled in accordance with conventional magnet wire procedures.

EXAMPLE II

A solution containing 90 grams of trimethylolpropane triisocyanate (Mondur CB 75, sold by Mobay Chemical Co.) and 225 grams of tertiary amyl alcohol was refluxed for three hours at a temperature of approximately 109° C. After cooling, this mixture was stirred into a room temperature solution of 330 grams of vinyl butyral resin (Butvar B 73, sold by Monsanto Co.) in 1125 grams of ethoxyethanol (Cellosolve solvent, sold by Union Carbide Corporation and 1125 grams of xylene.

The product was then applied to an insulated conductor employing dies by a conventional wire coating tower having bank temperatures of 275° F., 375° F., and 475° F., respectively. The increase in diameter of the bonding top coat was between 0.7 and 1.0 mil for AWG 24 wire. The resulting over-coated conductor was spooled and handled in accordance with conventional magnet wire procedures.

EXAMPLE III

A solution containing 60 grams of p,p' diphenyl methane diisocyanate (Mondur MR, sold by Mobay Chemical Co.) and 360 grams of tertiary amyl alcohol was refluxed for three hours at a temperature of approximately 109° C. After cooling, this mixture was stirred into a room temperature solution of 330 grams of vinyl butyral resin (Butvar B 73, sold by the Monsanto Co.) in 1650 grams of normal butanol and 600 grams of xylene.

The product was then applied to an insulated conductor employing dies by a conventional wire coating tower having blank temperatures of 275° F., 375° F., and 475° F., respectively. The increase in diameter of the bonding top coat was between 0.7 and 1.0 mil for AWG 24 wire. The resulting over-coated conductor was spooled and handled in accordance with conventional magnet wire procedures.

EXAMPLE IV

A solution containing 22.4 grams trimethylolpropane triisocyanate (Mondur CB 75, sold by Mobay Chemical Co.) and 56 grams of cyclohexanol and 22.4 grams of xylol was refluxed for three hours at about 126° C. After cooling, this mixture was stirred into a room temperature solution of 61.6 grams of vinyl butyral resin (Butvar B 73, sold by Monsanto Co.) in 201.6 grams of xylol and 224 grams of ethoxyethanol (Cellosolve solvent, sold by Union Carbide Corporation).

The product was then applied to an insulated conductor employing dies by a conventional wire coating tower having bank temperatures of 275° F., 375° F., and 475° F., respectively. The increase in diameter of the bonding top coat was between 0.7 and 1.0 mil for AWG 24 wire. The resulting over-coated conductor was spooled and handled in accordance with conventional magnet wire procedures.

EXAMPLE V

A solution containing 5 grams of p,p' diphenyl methane diisocyanate (Mondur MR, sold by Mobay Chemical Co.) and 15 grams of isopropyl alcohol was refluxed for two hours at a temperature of approximately 83° C. After cooling, this mixture was stirred into a room temperature solution of 312 grams of a 32% weight solution of a phenoxy resin (Eponol 55-L-32, sold by Shell Chemical Co.) in ethoxy glycol acetate (Cellosolve acetate solvent, sold by Union Carbide Corporation) in 140 grams of xylol, 30 grams of isopropyl alcohol, 0.1 gram of 2,6 ditertiary butyl para cresol antioxidant (Kerobit TBK, sold by B.A.S.F. Co.) and 3.0 grams of urea formaldehyde resin (Bettle 227-8, sold by American Cyanamid Co.).

The filtered product was then applied to an insulated conductor employing dies by a conventional wire coating tower having bank temperatures of 325° F., 425° F., and 525° F., respectively. The increase in diameter of the bonding top coat was between 0.7 and 1.0 mil for AWG 24 wire. The resulting over-coated conductor was spooled and handled in accordance with conventional magnet wire procedures.

EXAMPLE VI

A solution containing 9 grams of tris (toluylene isocyanate) isocyanurate (Mondur SH, sold by Mobay Chemical Co.), 23 grams of cyclohexanol, 4 grams of xylol, and 9 grams of anisol was refluxed for one hour at approximately 127° C. While holding this mixture at this temperature, this mixture was stirred into a room temperature solution of 123.2 grams of a 65% weight ethylene glycol terephthalate 35% weight phenyl indenate polyester copolymer having a 0.65 intrinsic viscosity (B.X.91J-910 resin, sold by Goodyear Tire & Rubber Co.) in 90.0 grams of monochlorobenzene and 348.4 grams of cyclohexanone.

The product was filtered and then applied to an insulated conductor employing dies by a conventional wire coating tower having bank temperatures of 300° F., 400° F. and 500° F., respectively. The increase in diameter of the bonding top coat was between 0.7 and 1.0 mil for AWG 24 wire. The resulting over-coated conductor was spooled and handled in accordance with conventional magnet wire procedures.

EXAMPLE VII

A solution containing 8 grams of tris (toluylene isocyanate) isocyanurate (Mondur SH, sold by Mobay Chemical Co.), 25 grams of cyclopentanol, and 10 grams of anisol was refluxed for one hour at approximately 140° C. After cooling, this mixture was stirred into a room temperature solution of 250 grams of a 40% weight solution of an phenoxy resin in methyl ethyl ketone (Eponol 55-B-40, sold by Shell Chemical Co.) in 150 grams of ethoxyethanol (Cellosolve solvent, sold by Union Carbide Corp.), 150 grams of xylol, and 0.0315 gram of 2,6 ditertiary butyl paracresol antioxidant (Kerobit TBK, sold by B.A.S.F. Co.).

The filtered product was then applied to an insulated conductor employing dies by a conventional wire coating tower having bank temperatures of 275° F., 375° F., and 475° F., respectively. The increase in diameter of the bonding top coat was between 0.7 and 1.0 mil for AWG 24 wire. The resulting over-coated conductor was spooled and handled in accordance with conventional magnet wire procedures.

EXAMPLE VIII

A solution containing 20 grams of trimethyolpropane triisocyanate (Mondur CB 75, sold by Mobay Chemical Co.) and 50 grams of cyclopentanol was refluxed for one hour at a temperature of approximately 140° C. This mixture was stirred into a room temperature solution of 61.6 grams of vinyl butyral resin (Butvar B 73, sold by Monsanto Co.) in 224 grams of ethoxyethanol (Cellosolve solvent, sold by Union Carbide Corp.) and 224 grams of xylol.

The filtered product was then applied to an insulated conductor employing dies by a conventional wire coating tower having bank temperatures of 275° F., 375° F., and 475° F., respectively. The increase in diameter of the bonding top coat was between 0.7 and 1.0 mil for AWG 24 wire. The resulting over-coated conductor was spooled and handled in accordance with conventional magnet wire procedures.

EXAMPLE IX

A solution containing 100 grams of trimethylolpropane triisocyanate (Mondur CB 75, sold by Mobay Chemical Co.) and 250 grams of isopropyl alcohol was refluxed for three hours at a temperature of approximately 83° C. This mixture was stirred into a room temperature solution of 308 grams of vinyl butyral resin (Butvar B 73, sold by Monsanto Co.) in 1120 grams of ethoxyethanol (Cellosolve solvent, sold by Union Carbide Corporation) and 1120 grams of xylol.

The filtered product was then applied to an insulated conductor employing dies by a conventional wire coating tower having bank temperatures of 275° F., 375° F. and 475° F., respectively. The increase in diameter of the bonding top coat was between 0.7 and 1.0 mil for AWG 24 wire. The resulting over-coated conductor was spooled and handled in accordance with conventional magnet wire procedures.

In each of the Examples I through V, VIII and IX the end of the blocking reaction may be conveniently ascertained by conventional techniques using an infra-red spectrophotometer. In the case of a "blocked" isocyanate, the bond near 4.4 to 4.5 microns should be completely absent or merely a small fraction of the bond height of the "unblocked" material. In each of the Examples VI and VII, in which Mondur SH is used, a replacement of the phenol by the alcohol or "transblocking" takes place.

Each of the coated conductors of the above examples was evaluated in accordance with a Helical Coil Bond Test (Phelps Dodge Test Procedure No. 46). In this test, the coated conductors are wound on one quarter inch rods into coils of about three inches in length. These coils comprise a single layer of magnet wire. The coils are held under slight spring tension for one hour in a conventional oven at a temperature between 150° C. and 250° C. By this means, the adjacent portions of the coated conductor are bonded together to form a self-supporting and integral coil member. The bonded coils are removed from the one quarter inch rods and mounted within an oven in a manner by which both ends of the coil are supported and held while the central portion therebetween is unsupported. The oven is held at either 150° C. or 200° C. and progressively larger forces are applied to the coil by attaching weights to the central portion of the coil until the coil breaks or sags. The results are given in terms of the number of grams that the coil can support (pass) and the number of grams which causes the coil to break or sag (fail) at a given oven temperature. As above-mentioned, this is a conventional test to measure the bond strength of various coil bonding compositions.

The table below illustrates the superiority in bond strength of the bonding composition of the examples over a conventional thermoplastic polyvinyl butyral bonding composition.

ventional bonded coils in uses where high temperatures and the resulting plastic flow of thermoplastic bonding compositions may be encountered or in uses where the coils are exposed to solvents.

Magnet wire made in accordance with Examples I and II each was used to make an armature and stator of a 5 H.P.D.C. motor. After winding, each of the stators and armatures was baked in a conventional baking oven for one hour at approximately 190° C. In this manner, the coils were bonded in accordance with the invention. The completed motors performed satisfactorily in spite of the fact that temperatures as high as 260° C. were encountered and the armature turned at over 4000 r.p.m. on a 5 inch stacking during operation. No distortion or relative movement of the coil turns were apparent after operation.

The improved bonding compositions of the invention have all of the physical and electrical properties of good magnet wire insulations. This allows the bonding compositions of this invention to be applied directly to other insulation on a conductor, as shown in FIG. 1, and used as "self-bonding" adhesive medium applied directly to articles, as shown in FIG. 2, to hold articles and insulation together and to be thermoset as desired.

TABLE I

| AWG | Type of cement | Bonding treatment | Bond strength (grams) 150° C. Pass | Bond strength (grams) 150° C. Fail | Bond strength (grams) 200° C. Pass | Bond strength (grams) 200° C. Fail |
| --- | --- | --- | --- | --- | --- | --- |
| #18 | Polyvinyl butyral resin overcoat over a coating of urethane-nylon insulation on a conductor, as sold under the Registered Trademark Nyleze by Phelps Dodge Magnet Wire Corporation. (This wire is sold under the Registered Trademark Sy Bondeze by Phelps Dodge Magnet Wire Corporation). | 1 hr. at 150° C. | 50 | 100 | | |
| #24 | Polyvinyl butyral resin, tertiary amyl alcohol and trimethylolpropane triisocyanate resin overcoat in accordance with Example I over a coating of terephthalic polyester amide-imide insulation on a conductor (Armored Polythermaleze 2000 wire sold by Phelps Dodge Magnet Wire Corporation). | 1 hr. at 200° C. | 660 | 710 | 550 | 610 |
| #24 | Polyvinyl butyral resin, tertiary amyl alcohol and trimethylolpropane triisocyanate resin overcoat in accordance with Example II over a coating of terephthalic polyester amide-imide insulation on a conductor (Armored Polythermaleze 2000 wire sold by Phelps Dodge Magnet Wire Corporation). | do | 660 | 710 | 500 | 550 |
| #24 | Polyvinyl butyral resin, tertiary amyl alcohol and p, p' diphenyl methane diisocyanate resin overcoat in accordance with Example III over a coating of terephthalic polyester amide-imide insulation on a conductor (Armored Polythermaleze 2000 wire sold by Phelps Dodge Magnet Wire Corporation). | 1 hr. at 200° C. | 500 | 550 | | |
| #24 | Polyvinyl butyral resin, cyclohexanol, xylol and trimethylolpropane triisocyanate resin overcoat in accordance with Example IV over a coating of terephthalic polyester amide-imide insulation on a conductor (Armored Poly-Thermaleze 2000 wire, sold by Phelps Dodge Magnet Wire Corporation). | 1 hr. at 175° C. | | | 200 | 250 |
| #24 | Phenoxy resin, isopropyl alcohol xylol, p,p' diphenyl methane diisocyanate resin, urea formaldehyde resin overcoat in accordance with Example V over a coating of terephthalic polyester-amideimide insulation on a conductor (Armored Poly-Thermaleze 2000 wire, sold by Phelps Dodge Magnet Wire Corporation). | 1 hr. at 200° C. for 150° C. test; 220° C. for 200° C. test. | 430 | 480 | 330 | 380 |
| #24 | Ethylene glycol terephthalate Phenyl indenate polyester copolymer, cyclohexanol, xylol, anisol & tris (toluylene isocyanate) isocyanurate resin overcoat in accordance with Example VI over a coating of terephthalic polyester amide-imide insulation on a conductor (Armored Poly-Thermaleze 2000 wire, sold by Phelps Dodge Magnet Wire Corporation). | do | 520 | 570 | 230 | 280 |
| #24 | Phenoxy resin, cyclopentanol, anisol and tris (toluylene isocyanate) isocyanurate resin overcoat in accordance with Example VII over a coating of terephthalic polyester-amide-imide insulation on a conductor (Armored Poly-Thermaleze 2000 wire, sold by Phelps Dodge Magnet Wire Corporation). | 1 hr. at 200° C. for 150° C. test, 220° C. for 200° C. test. | 500 | 550 | 275 | 325 |
| #24 | Polyvinyl butyral resin, cyclopentanol, and trimethylolpropane diisocyanate resin overcoat in accordance with Example VIII over a coating of terephthalic polyester-amide-imide insulation on a conductor (Armored Poly-Thermaleze 2000 wire, sold by Phelps Dodge Magnet Wire Corporation). | do | 450 | 500 | 475 | 525 |
| #18 | Polyvinyl butyral resin, isopropyl alcohol and trimethylolpropane triisocyanate resin overcoat in accordance with Example IX over a coating of terephthalic polyester-amide-imide insulation on a conductor (Armored Poly-Thermaleze 2000 wire, sold by Phelps Dodge Magnet Wire Corporation). | 1 hr. at 220° C. | | | 950 | 1,000 |

The results shown in the above table clearly demonstrate the superiority of the bonding composition of the present invention. This increased bond strength makes bonded coils of the present invention more desirable than con- The electrical properties of the specific bonding composition of Example I, applied in accordance therewith as an over-coat on a coating of terephthalic polyester-amide-imide insulation on a conductor (Armored Poly- Thermaleze 2000 wire, sold by Phelps Dodge Magnet Wire Corporation), are shown in Table II:

TABLE II

| AWG | 18 |
|---|---|
| Dimensions | O.D., 0440-0442. Cement, 0010-0010. Insulation, 0430-0430. Bare wire, 0400-0402. |
| Elongation | 35%. |
| Flex 20% 1X | OK breaking point. |
| Snap | OK. |
| Snap 1X | 1 check. |
| Repeated scrape | 133. |
| Heatshock: | |
| 20%, 3X at 220° C | No checks/20 turns. |
| Do | Do. |
| Reliance burnout | 3.2 minutes. |
| Variable pressure cutthrough at 300° C | 31½ lbs. |
| IEEE 57 at 260° C | 430 hrs.—OK. |
| Dielectric at R.T | 13,200 volt. |

Bonding compositions of the invention including either a properly chosen phenoxy resin or a polyester resin applied as an over-coat in a similar manner on a coating of terephthalic polyester-amide-imide insulation on a conductor (Armored Poly-Thermaleze 2000 wire, sold by Phelps Dodge Magnet Wire Corporation) have similar electrical properties.

The method of fabricating bonded articles disclosed herein offers several advantages over prior art methods. First, a more uniform and stronger bond is possible in coils. This is especially true well within the windings of the coil where varnishes or the like can hardly penetrate. Further, the curing step of the present invention can be significantly faster than the bonding steps used with impregnating varnishes. Of great importance, of course, is the increased strength and durability of the thermoset bond of the present invention over conventional thermoplastic bonds.

It is possible in some cases to bond the coils of the present invention by resistance bonding, that is by heating the coil by passing currents through the conductor of the coil. Generally, this method is faster and in some instances permits the setting of the resin to occur in considerably less time than the one hour bonding treatment of Table I.

The improved bonding compositions of this invention are thermoset in accordance with a mechanism exemplified by the reaction illustrated by Equation 2 hereinabove. This mechanism allows the thermosetting of the bonding compositions of the invention to be controlled, this is an important feature of the invention.

The mechanism of the thermosetting of the improved bonding compositions of this invention makes possible remarkable changes in the approach to the design of an insulation system for electrical equipment, particularly windings (this is in contrast to the use of the bonding compositions as an adhesive). For example, in the manufacture of motor windings particularly stators for fractional and integral horsepower motors, it is essential that the wire deep down in the winding be adequately bonded turn-to-turn. Normally, this is attempted by various impregnation techniques, not always with success. However, the properties of the improved bonding compositions of this invention are such that when used in accordance with the method of this invention to fabricate such windings of magnet wire coated with the bonding compositions of this invention, the turns deep down within the coils or motor slots can be firmly bonded turn-to-turn, and further, can be thermoset such that the bond remains firm even when operating temperatures reach as high as 180° C. Operation at 180° C. is questionable with coils fabricated by prior art varnish impregnation or even vacuum impregnation techniques.

Motor windings of this type are also frequently hermetically sealed in compressors and thus operate in atmospheres of refrigerant. In such units, the liquid or gas refrigerant is in contact with the windings. Any extractables from the windings can clog the capillary tubes or pressure reducing float valves conventionaly found in such compressors. Such possibilities exclude the use of prior art thermoplastic bonding compositions which are normally soluble in refrigerants and give high extractables. However, coils fabricated in accordance with the method of this invention and utilizing the improved bonding compositions of this invention have windings having a relatively low extractable content. Ths is due to the fact that the improved bonding compositions of this invention can be thermoset and thus are more resistant to solvent attack than prior art thermoplastic bonding compositions. Typical examples of the resistance of the bonding compositions of this invention to solvent attack are shown in Table III:

TABLE III

| Treatment | Methanol extraction, percent | |
|---|---|---|
| | Weight method | Residue method |
| Coil bonded at 200° C. for 1 hr.—bonding composition thermoset | 0.69 | 2.30 |
| Coil cured at 150° C. for 10 minutes—bonding composition thermoplastic and coil not bonded | 17.51 | 15.69 |

Another typical example of the use of the improved bonding composition of this invention is in insulating round or rectangular wire, either copper or aluminum, or strip or foil conductors. (see FIG. 1). Transformer coils fabricated from these materials in accordance with the method of this invention undergo high overload, short circuit or lightning surges, in certain uses, which throw tremendous forces on such coils when they are loaded and operating at elevated temperatures. Such coils are either operated in oil, in air or in some cases in chlorinated diphenyl (Askarel, sold by Dow Chemical Company). The improved bonding compositions of this invention provide such coils which can be bonded in a firm manner turn-to-turn and thermoset. These coils have remarkably greater resistance to physical damage from the afore-mentioned disruptive forces and remain firmly bonded, turn-to-turn, even at operating temperatures from about 100° C. to about 200° C.

Prior art thermosetting bonding compositions and adhesives heretofore have been applied to articles and partially cured to what is commonly referred to as a "B stage." These articles then are formed into a product and bonded together and thermoset by completing the curing of the bonding composition or adhesive. This procedure is contrasted to the mechanism of the invention and is characterized by a lack of control over the thermosetting of the bonding composition or adhesive. There has always been trouble with the stability of "B stage" materials particularly when it is necessary to use these products in the "B stage." This lack of stability on the shelf or in use is due to the fact that the same mechanism is used to cure and to thermoset "B stage" materials and the rate at which such materials are cured and thermoset is both a function of temperature and time.

In contrast, the curing and thermosetting of the bonding compositions of the invention are carried out in accordance with separate and completely distinct mechanisms. Also, the rate at which the bonding compositions of the invention are thermoset is primarily a function of temperature. The mechanism by which the compositions are thermoset has been selectively chosen to occur at a rate which is less a function of time than temperature and significantly less a function of time than conventional thermosetting bonding compositions or adhesives heretofore used.

For all of the reasons above stated, improved control is achieved over the thermosetting of the bonding compositions of the invention than heretofore possible with prior art thermosetting bonding compositions or adhesives. This improved control allows the bonding compositions of the invention to be used either as a thermoplastic bonding composition or a thermoset bonding composition, as desired. Because the rate at which the bonding compositions of the invention are thermoset is primarily a function of the "unblocking" temperature chosen, the setting of bonding compositions of the invention can be controlled, whereas this was not so with prior art thermosetting materials.

Figure 4:
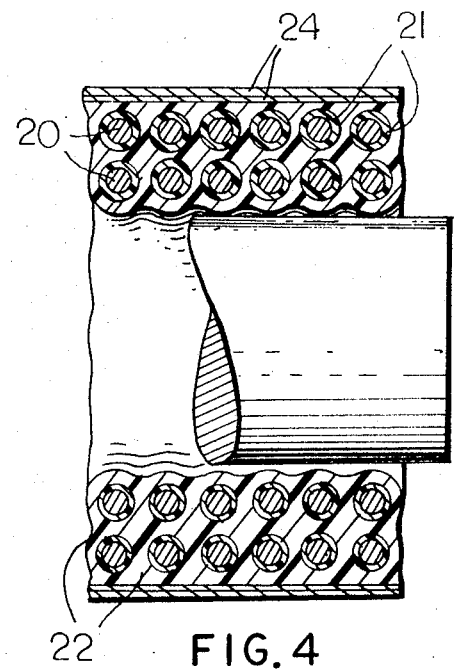
FIG. 4 is a fragmentary and cross-sectional view of the coil illustrated in FIG. 3 having a bonded paper coating thereon, both the coil and the paper coating being fabricated in accordance with the method of the invention.

The coil illustrated in FIG. 3 is shown in FIG. 4 to have a bonded paper coating thereon. The paper coating is formed by applying the bonding composition to conventional kraft paper in any conventional manner, for example, by dipping or vacuum impregnation techniques, or by brush, roller or the like. The paper is then baked in accordance with the methods above-described to form a bondable paper product. This bondable product like those above-mentioned has a tough, non-tacky, thermoplastic film thereon and can be stored at room temperature, for long lengths of time.

The coil illustrated in FIG. 3 is then wrapped with the bondable paper product to form one or more layers 24 of the paper product thereon. Adjacent portions of the paper product are then bonded together by any of the methods above-described.

Other paper materials, cloth materials including textiles and non-woven materials or material made of glass fibers can be treated with the bonding compositions of this invention to form a bondable product and a variety of bonded products in accordance with the methods above-described.

Each of the materials above-mentioned to which the bonding compositions of this invention are applied has portions thereof which are submerged in the bonding composition and are bonded thereto. These submerged portions can be bonded to other portions of the same material or a portion of a different material which likewise is submerged in a bonding composition of this invention in accordance with the methods above-described.

While there have been described above the principles of this invention in connection with specific apparatus, it is to be clearly understood that this description is made only by way of example and not as a limitation to the scope of the invention.

What is claimed is:
1. A composition of matter comprising the combination of a compound having a plurality of

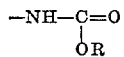

groups where R is an organic radical, and an essentially linear thermoplastic bonding resin, said combination being thermoplastic at all temperatures below a predetermined temperature and being thermosetting at a temperature above said predetermined temperature and at all temperatures above said last-mentioned temperature.

2. The composition of matter of claim 1 wherein said combination is soluble in a solvent to the extent that a solution of about 12% weight to about 40% weight reaction product has solution viscosity of about 100 to about 3000 centipoises at 25° C., said solvent having a boiling point below about 160° C. at atmospheric pressure.

3. The composition of matter of claim 1 wherein said compound is a reaction product of a second compound having a plurality of —N=C=O groups and a third compound having an "unblocking" temperature at atmospheric pressure in excess of about 150° C.

4. The composition of matter of claim 3 wherein said third compound is one of the compounds of the group of alcohols and soluble compounds having in solution a

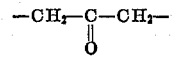

group in equilibrium with a

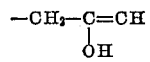

5. The composition of matter of claim 1 wherein said bonding resin is a resin of the group of vinyl butyral resins, phenoxy resins and polyester resins, said resin having at least three reactive sites per one hundred repetitive units of said resin.

6. The composition of matter of claim 4 wherein said isocyanate is one of the compounds of the group of p,p'-diphenylmethane diisocyanate, trimethylol propane triisocyanate and tris (toluylene isocyanate) isocyanurate, and said alcohols are of the compounds of the group of methanol; ethanol; propanol, and its isomers; butanol, and its isomers; pentanol, and its isomers; cyclopentanol; and cyclohexanol.

References Cited
UNITED STATES PATENTS

| | | | |
|---|---|---|---|
| 3,043,794 | 7/1962 | Feiler et al. | 156—331 X |
| 3,045,036 | 7/1962 | Jex et al. | 156—331 X |
| 3,063,958 | 11/1962 | Perkins et al. | 156—331 UX |
| 3,067,085 | 12/1962 | Limperos | 156—331 X |
| 3,088,934 | 5/1963 | Bonanni | 156—331 X |
| 3,252,848 | 5/1966 | Borsellino | 156—331 X |
| 3,255,068 | 6/1966 | Smith | 156—331 X |
| 3,259,516 | 7/1966 | Dempsey et al. | 156—331 X |
| 3,255,069 | 7/1966 | Crowley et al. | 156—331 X |
| 3,325,333 | 6/1967 | Kigane et al. | 156—331 |
| 3,398,043 | 8/1968 | Youngs | 156—331 X |
| 3,438,922 | 4/1969 | Ueno et al. | 156—331 X |
| 3,503,845 | 3/1970 | Hollatz et al. | 156—331 X |
| 3,567,695 | 3/1971 | Brotherton et al. | 156—331 X |

STEPHEN J. LECHERT, JR., Primary Examiner

U.S. Cl. X.R.

260—77.5 TB, 453 AL, 859 R; 156—331

UNITED STATES PATENT OFFICE
CERTIFICATE OF CORRECTION

Patent No. 3,745,138  Dated July 10, 1973

Inventor(s) Ernest C. Koerner et al.

It is certified that error appears in the above-identified patent and that said Letters Patent are hereby corrected as shown below:

SPECIFICATION

Column 1, line 22, "article" should be --articles--;
Column 2, line 17, "buytral" should be --butyral--;
Column 2, line 29, "Magnet-Wire" should be --Magnet Wire--;
Column 3, line 21, "progresss" should be --progresses--;

Column 5, lines 44-46, "$-CH_2-\underset{OH}{C}-CH_2-$" should be $-CH_2-\underset{O}{\overset{\|}{C}}-CH_2-$;

Column 5, lines 48-50, "$-CH_2-\underset{O}{C}=CH-$" should be $-CH_2-\underset{OH}{\overset{|}{C}}=CH-$;

Column 8, line 19, after "time" insert --and--;
Column 8, line 67, after "Corporation" insert --)--;
Column 9, line 49, "Bettle" should be --Beetle--;
Column 9, lines 68-69, delete "(B.X.91J-910 resin, sold by Goodyear Tire & Rubber Co.)";
Column 11, line 34, "Polythermaleze" should be --Poly-Thermaleze--;
Column 11, line 38, "Polythermaleze" should be --Poly-Thermaleze--;
Column 11, line 42, "Polythermaleze" should be --Poly-Thermaleze--;
Column 11, line 49, "polyester-amideimide" should be --polyester-amide-imide--;
Column 11, line 52, "Phenyl" should be --phenyl--;
Column 13, line 14, "Do____" should be --20% 3X at 260°C.--;
Column 13, line 47, "2" should be --(2)--.

IN THE CLAIMS

Claim 4, col. 16, lines 19-21, "$-CH_2-\underset{OH}{C}-CH$" should be $-CH_2-\underset{OH}{\overset{|}{C}}=CH-$ Signed and sealed this 16th day of July 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,745,138            Dated July 10, 1973

Inventor(s) Ernest C. Koerner et al.

It is certified that error appears in the above-identified patent and that said Letters Patent are hereby corrected as shown below:

SPECIFICATION

Column 1, line 22, "article" should be --articles--;
Column 2, line 17, "buytral" should be --butyral--;
Column 2, line 29, "Magnet-Wire" should be --Magnet Wire--;
Column 3, line 21, "progresss" should be --progresses--;

Column 5, lines 44-46, "$-CH_2-\underset{OH}{C}-CH_2-$" should be $-CH_2-\underset{O}{C}-CH_2-$;

Column 5, lines 48-50, "$-CH_2-\underset{O}{C}=CH-$" should be $-CH_2-\underset{OH}{C}=CH-$;

Column 8, line 19, after "time" insert --and--;
Column 8, line 67, after "Corporation" insert --)--;
Column 9, line 50, "Bettle" should be --Beetle--;
Column 9, lines 68-69, delete "(B.X.91J-910 resin, sold by Goodyear Tire & Rubber Co.)";
Column 11, line 34, "Polythermaleze" should be --Poly-Thermaleze--;
Column 11, line 38, "Polythermaleze" should be --Poly-Thermaleze--;
Column 11, line 42, "Polythermaleze" should be --Poly-Thermaleze--;
Column 11, line 49, "polyester-amideimide" should be --polyester amide-imide--;
Column 11, line 52, "Phenyl" should be --phenyl--;
Column 13, line 16, "Do____" should be --20% 3X at 260°C.--;
Column 13, line 47, "2" should be --(2)--.

IN THE CLAIMS

Claim 2, col. 16, lines 3-4, delete "reaction product" and insert --of said combination--;
Claim 2, col. 16, line 4, after "has" insert --a--;
Claim 4, col. 16, lines 19-21, "$-CH_2-\underset{OH}{C}-CH$" should be $-CH_2-C-\underset{OH}{CH}-$ Signed and sealed this 8th day of October 1974.

(SEAL)
Attest:

McCOY M. GIBSON JR.            C. MARSHALL DANN
Attesting Officer            Commissioner of Patents